United States Patent [19]

Slyker et al.

[11] Patent Number: 4,521,040
[45] Date of Patent: Jun. 4, 1985

[54] COMBINED METAL AND ELASTOMER SEAL

[75] Inventors: Richard W. Slyker; John R. Pettit, both of Ventura, Calif.

[73] Assignee: Vetco Offshort, Inc., Ventura, Calif.

[21] Appl. No.: 419,270

[22] Filed: Sep. 17, 1982

[51] Int. Cl.³ .............................................. F16L 21/04
[52] U.S. Cl. ................................... 285/140; 285/338; 285/351; 166/88; 277/9.5
[58] Field of Search ............... 285/140, 196, 338, 147, 285/346, 351, 348, 337, DIG. 11, 342, 23; 166/88, 87; 277/117, 9.5, 188, 181

[56] References Cited

U.S. PATENT DOCUMENTS

| | | | |
|---|---|---|---|
| 1,993,307 | 3/1935 | Nicholson | 285/338 X |
| 3,045,830 | 7/1962 | Fulton | 285/346 X |
| 3,460,615 | 8/1969 | Watkins | 166/88 X |
| 3,492,026 | 1/1970 | Ahlstone | 285/348 X |
| 3,653,671 | 4/1972 | Shipes | 166/88 X |
| 3,688,841 | 9/1972 | Baugh | 285/140 X |
| 3,797,864 | 3/1974 | Hynes et al. | 285/140 |
| 3,871,449 | 3/1975 | Ahlstone | 285/140 X |
| 4,324,422 | 4/1982 | Rains et al. | 285/140 |

Primary Examiner—Dave W. Arola
Attorney, Agent, or Firm—Edward L. Kochey, Jr.

[57] ABSTRACT

A seal and seal assembly for sealing the annular space (14) between casing hanger bodies. An elastomeric seal ring (22) is interposed between metallic seal rings (20,24) having lips (36,38,40,42). The elastomeric ring is thicker (48) than the metal rings. The lips are of specific configuration, and the seat is supported (28) to permit downward movement of the upper seal ring (20) after compression setting.

13 Claims, 6 Drawing Figures

COMBINED METAL AND ELASTOMER SEAL

This invention relates to seals and in particular to a seal and seal assembly for sealing the annular space between wellhead casing hangers.

In drilling of subsea wells, concentric casings are hung. These protect the higher strata from the pressure and fluids which may be encountered at greater depths. Casing hangers are concentrically located to support the various casing strings.

It is necessary to contain the pressure within the inner casings so that the annular space outside of the inner casing does not receive the high pressure. For this purpose, it is known to pack off or seal the annular space between the hanger bodies as shown in U.S. Pat. No. 3,492,026, granted Jan. 27, 1970.

A particular seal for packing off the annular opening is shown in U.S. Pat. No. 3,797,864, Hynes et al. This prior art seal comprises an elastomeric ring interposed between two metallic rings. Each ring has a pair of lips extending toward the elastomer so that on axial compression the lips are forced outwardly into contact with the walls. Effecting its seal with the Hynes et al seal for 10,000 psi pressure required a torque on the packing nut of 20,000 foot pounds. This torque must be applied at the platform above the water surface and transmitted through a long drill pipe to torque the packing nut. It must be applied in the reverse direction to remove the seal, facing the danger of unscrewing a joint of the drill pipe.

Raines et al, U.S. Pat. No. 4,324,422, reduced the torque requirement by forming feet at the tip of the lips (FIGS. 5 thereof) so that higher metal sealing contact force was obtained for a given axial force.

This worked satisfactorily for low pressures; but attempts to seal against high pressures such as 15,000 psi, sometimes led to failure. The foot sealed at low force, but the high force required for higher pressure caused the lip to bow outwardly rotating around the heel of the foot. This raised the tip permitting the elastomer to extrude.

SUMMARY OF THE INVENTION

The seal and seal assembly comprises an elastomer seal ring interposed between two metallic seal rings, each having two extending lips, forcible outwardly by the elastomer. The elastomeric ring is thicker than both the metallic rings and the annular space to be sealed. When this seal is forced into the annulus, a low pressure seal is formed by the elastomer. Accordingly, while the seal may be compression set it need not be since the seal will be pressure energized.

At least the lower ring has the outer surface of the lips substantially parallel in the unenergized condition. The lips have an increasing thickness with length from the tip and a reduced thickness near the base. The tips of the lips have a rounded inner edge, and the elastomer has an upper portion immediately below the upper ring of the same diameter as the metal ring.

The packing nut for compressing the seal has provision to permit the upper ring to move down when pressure energized.

DESCRIPTION OF THE PREFERRED EMBODIMENT

Figures 1, 2:
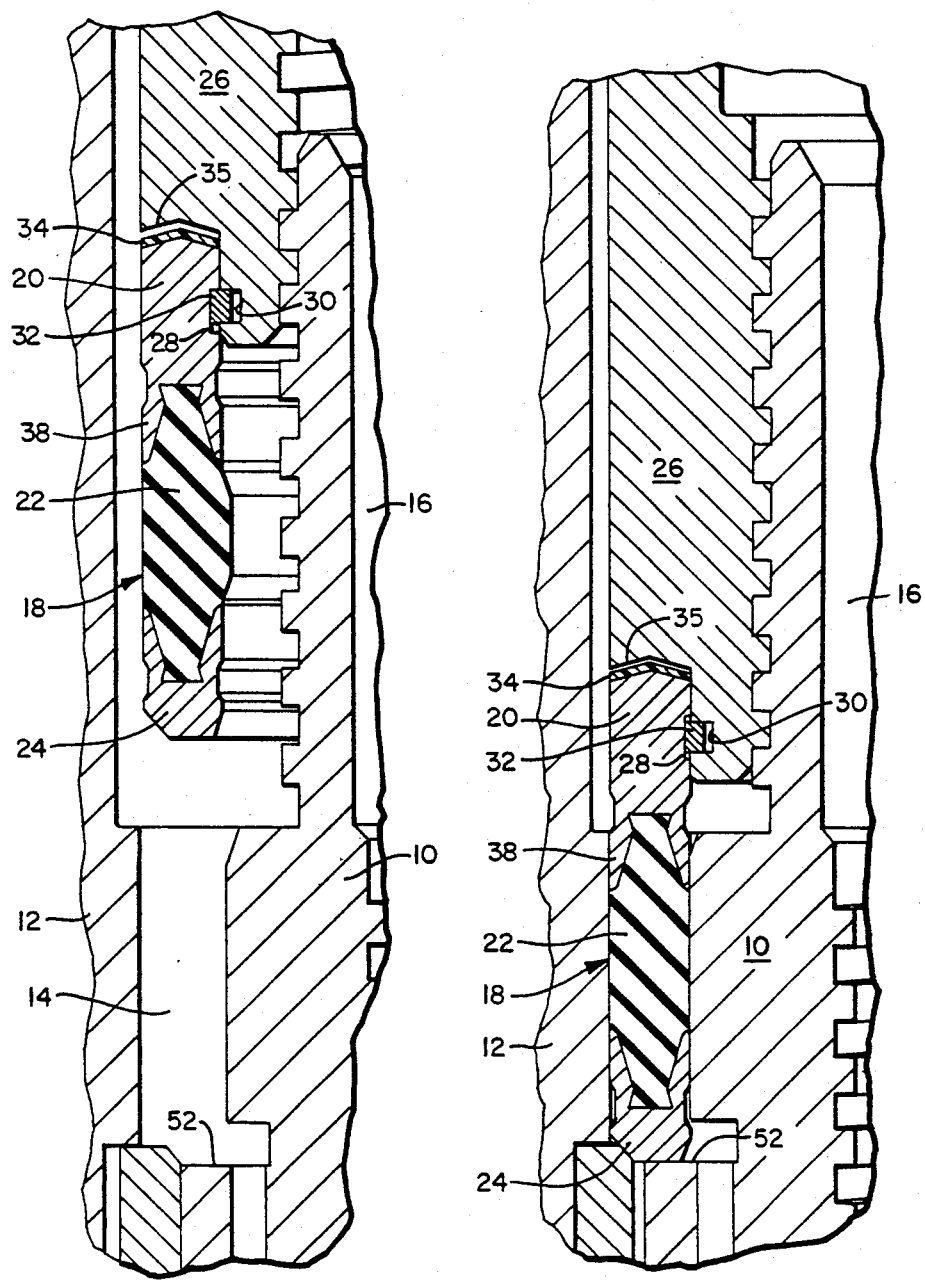
FIG. 1 is a section of the seal assembly in the unenergized condition.
FIG. 2 is a sectional view of the seal assembly in the pressure energized condition.

Inner casing hanger body 10 carrying a string of casing has been supported from intermediate casing hanger body 12. Typical arrangements are shown in U.S. Pat. Nos. 3,492,026 and 3,797,864. It is desired to pack off the annular space 14 to prevent high pressure from the bore 16 reaching and pressurizing the annular space between the casing strings.

It is desired to place seal 18 in the annular space 14. The seal comprises an upper metallic ring 20, an intermediate elastomeric seal ring 22, and a lower metallic seal ring 24. To this end a seal packing nut 26 is threadedly engaged with the hanger body 10 and may be rotated by a running tool, not shown.

A slot 28 exists in the upper seal ring, and a slot 30 exists in the packing nut. A snap ring 32 fits within both slots so that the seal may be carried on the packing nut and lifted thereby for removal of the seal. It is illustrated in this position in FIG. 1.

When the packing nut is rotated, the seal meets resistance as it enters space 14, and the space above the teflon bearing 34 closes with compression force being placed on the seal assembly by shoulder 35. Slots 28 and 30 are arranged so that the snap ring 32 does not bind during this operation.

Figure 3:
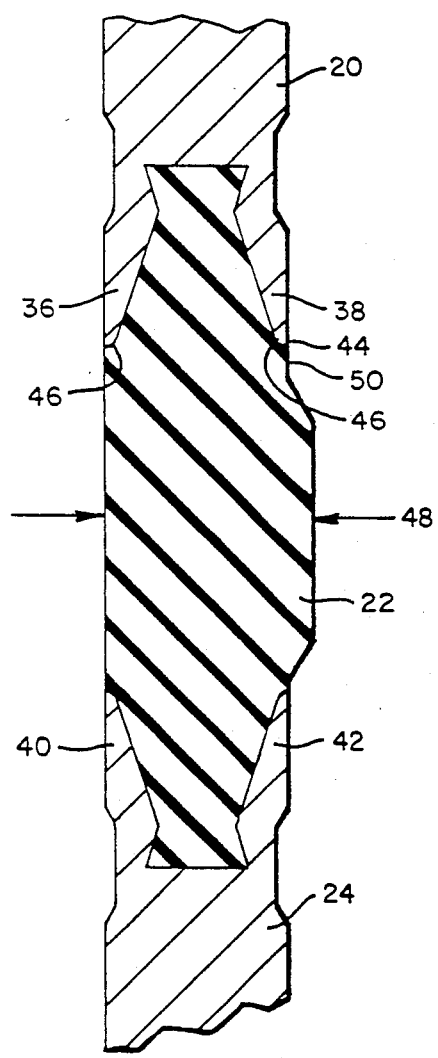
FIG. 3 is a section of the seal detail.

As best seen in FIG. 3, the upper seal ring 20 has two downwardly-extending lips 36 and 38 while the lower seal ring 24 has two upwardly-extending lips 40 and 42. Each of the tips 44 of the lips has an inner rounded edge 46 which improves the elastomer-metal interface insofar as pressure on the elastomer effectively forces the lip out for a line contact and minimizes the possibility of elastomeric extrusion through the gap.

The elastomer has a thickness 48 between 8 and 20 percent greater than the thickness of the metal seal rings. There is also a flat portion of the elastomer ring 50 of substantially the same thickness as the metal seal ring located immediately below the upper seal ring.

Referring to FIG. 2, it can be seen that as the seal ring is driven into annular space 14, the elastomer is compressed to a reduced thickness, thereby forming a low pressure seal between the hanger bodies. The seal is further driven down, and the flat 50 of the elastomer prevents movement of elastomer material in the space between lip 38 and the hanger body. At this time the seal is driven against only friction force, and the upper lips will tend to part in a manner described later in a discussion of the lips. The seal is further driven down until the lower metallic ring 24 abuts against shoulder 52 which is located on hanger body 10. At this point the seal may be fully compression set by driving down the packing nut with sufficient torque. Preferably, however, it is desirable to use only a partial compression set so that the torque requirements are minimized. After the partial compression set, whenever a high pressure exceeding that for which the packing was compression set exists, the existing low pressure seal is further energized. The seal will take the form shown in FIG. 3 where the pressure pushes the upper seal ring downwardly further compressing the elastomer. In order to permit this downward movement, slot 28 has a width greater than that of the snap ring.

Figure 4:
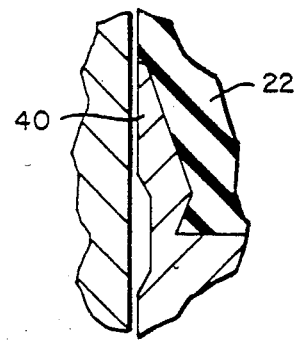
FIG. 4 shows the lip in the de-energized condition.
Figure 5:
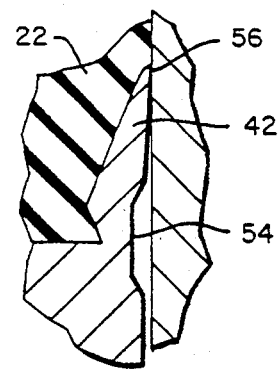
FIG. 5 shows the lip in the lightly energized condition.

Discussing now the operation of the lips particularly on the lower metallic seal ring 24, the initial position of the lips has the outer surfaces parallel as indicated by the single lip shown in FIG. 4. The initial thickness compression of the elastomeric ring 22 as it enters space 14 will not significantly affect the position of lips 40 and 42. When the ring hits stop 52 and additional force is imposed thereon, the force of the elastomer pushes the lips out as illustrated in FIG. 5. This is facilitated by the reduced thickness at 54 so that line contact at tip 56 is made with very little force. Accordingly, good contact is made before excessive pressure exists in the elastomer thereby preventing extrusion of the elastomer between the metal seal ring and the hanger body.

Figure 6:
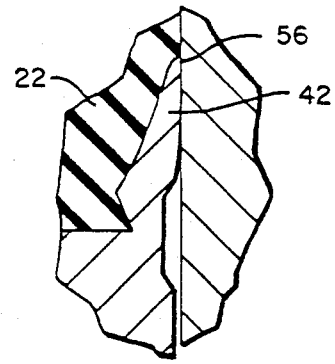
FIG. 6 shows the lip in the fully energized condition.

The lip has an increasing thickness with length from the tip through a majority of the length so that as pressure is increased, the lip deflects as shown in FIG. 6 with an increasing footprint between the seal ring and hanger body and without any lifting of the seal ring at the tip. At even higher pressure the lip will contact for its full length. While it is expected that a pressure tight metal seal will be formed, this is not considered as critical as maintaining the tip contact at all pressures so that extrusion of the elastomer into the gap is prevented.

Referring now to the upper seal ring, it can be seen that as the seal is pressed into annular space 14 there is some force placed on the lips because of friction. These lips, therefore, rotate around the reduced portion of the seal so that early contact is made with the tips of the lips to further preclude extrusion of the elastomer. So long as the seal is compression set, the action of the lips would be the same as those of the bottom seal except for the fact that they will be moving downwardly during the compression due to compression of the elastomer.

Furthermore, should reverse pressure occur, the lips will function in identical manner provided the upper seal ring 20 is against shoulder 35.

When the seal is pressure set, however, the lips will remain outwardly extended only to the extent that yield strength at the thin portion 54 was exceeded during the compression set. It, accordingly, is expected that the clearance will be reduced but not closed entirely. However, since it is the pressure which is exerting the downward force, it operates on the elastomer as well as the seal. This force energizes both the elastomer and the lower metal seal ring lips. The extremely high pressure against which the seal must operate is not a normal condition. It occurs during drilling only during pressure control loss situations. Therefore, while the seal must contain full pressure, most of its time is spent against lower pressures.

Partially pressure setting the seal will place the lips 36 and 38 of the upper seal ring 20 in contact with the walls. This is maintained during low pressure operation, thereby protecting the elastomer from the time dependent deteriorating effect of drilling fluid. Only during high pressure excursions can the fluid reach the elastomer.

The terms up and down are used for convenience, it being understood that under appropriate conditions the seal may be inverted or operate horizontally.

We claim:

1. A seal for an annular space comprising: a lower metallic seal ring; an upper metallic seal ring; an elastomeric seal ring interposed between said metallic seal rings, and having a thickness greater than each of said metallic rings; at least said lower ring having a pair of flexible lip portions extending upwardly with the outer surface of each lip linear for a majority of the length, said elastomeric seal ring including a substantial portion located between said flexible lip portions whereby axial force on said metallic rings compresses said elastomeric seal ring which in turn forces said lip portions outwardly; said lips having increasing thickness with length from the tip through a majority of the length, and a reduced thickness near the base of each of said lips.

2. A seal as in claim 3: each of said lips having a rounded inner edge at the tip thereof.

3. A seal as in claim 1: said upper seal ring also having a pair of lip portions extending downwardly with the outer surface of each lip being linear for a majority of its length.

4. A seal as in claim 3: said elastomeric ring having a reduced diameter portion at the upper end, adjacent the upper metallic ring, of substantially the same thickness as said upper ring and axially extending sufficient to prevent rollover of the elastomer around the lip portion of said upper seal ring.

5. A seal as in claim 4: each of said lips having a rounded inner edge at the tip thereof.

6. A seal as in claim 5: wherein the thickness of said elastomeric seal ring exceeds that of the metallic seal rings by between 8 and 20 percent.

7. A seal for an annular space comprising: a lower metallic seal ring; an upper metallic seal ring; an elastomer seal ring interposed between said metallic seal rings, and having a thickness greater than each of said metallic rings, the portion of the elastomeric seal ring forming the greater thickness extending on only one side of said metallic seal rings; at least said lower ring having a pair of flexible lip portions extending upwardly with the outer surface of each lip linear for a majority of the length, said elastomeric seal ring including a substantial portion located between said flexible lip portions whereby axial force on said metallic rings compresses said elastomeric seal ring which in turn forces said lip portions outwardly, the outer surface of the lip portions being substantially parallel; said lips having increasing thickness with length from the tip through a majority of the length and reduced thickness near the base.

8. A seal for an annular space comprising: a lower metallic seal ring; an upper metallic seal ring; an elastomer seal ring interposed between said metallic seal rings, and having a thickness greater than each of said metallic rings, the portion of the elastomeric seal ring forming the greater thickness extending on only one side of said metallic seal rings; said lower ring having a pair of flexible lip portions extending upwardly and said upper ring having a pair of flexible lip portions extending downwardly with the outer surface of each lip linear for a majority of the length, said elastomeric seal ring including a substantial portion located between said flexible lip portions whereby axial force on said metallic rings compresses said elastomeric seal ring which in turn forces said lip portions outwardly; said lips having increasing thickness with length from the tip through a majority of the length, and a reduced thickness near the base of each of said lips.

9. A seal for an annular space comprising: a lower metallic seal ring; an upper metallic seal ring; an elastomeric seal ring interposed between said metallic seal rings, and having a thickness greater than each of said metallic rings, the portion of the elastomeric seal ring forming the greater thickness extending on only one side of said metallic seal rings; said lower ring having a pair of flexible lip portions extending upwardly and said upper ring having a pair of flexible lip portions extending downwardly with the outer surface of each lip linear for a majority of the length, said elastomeric seal ring including a substantial portion located between said flexible lip portions whereby axial force on said metallic rings compresses said elastomeric seal ring which in turn forces said lip portions outwardly; said elastomeric ring having a reduced diameter portion at the upper end, adjacent the upper metallic ring, of substantially the same thickness as said upper ring; said lips having increasing thickness with length from the tip through a majority of the length, and a reduced thickness near the base of each of said lips.

10. A seal assembly for sealing an annular space between concentric pressure containing bodies, comprising: a first hanger body; a second hanger body concentrically supported within said first hanger body, whereby an annular space and a shoulder is defined between said hanger bodies; a lower metallic seal ring; an upper metallic seal ring, said lower and upper metallic seal rings having a thickness less than the annular space; an elastomeric seal ring interposed between said metallic seal rings, and having a thickness greater than the annular space, said metallic seal rings and said elastomeric seal ring comprising a seal; at least said lower ring having a pair of flexible lip portions extending upwardly with the outer surface of each lip linear for a majority of the length, said elastomeric seal ring including a substantial portion located between said flexible lip portions whereby axial force on said metallic rings compresses said elastomeric seal ring which in turn forces said lip portions outwardly; compression means for supporting said seal assembly and for compressing said seal downwardly against the shoulder; means for permitting additional downward movement of said upper ring without movement of said compression means; said compression means comprising a packing nut, annular grooves in said upper ring and packing nut, a snap ring within said annular grooves; said means for permitting additional movement comprising one of said grooves having significantly more width than said snap ring; said lips having increasing thickness with length from the tip through a majority of the length, and a reduced thickness near the base of each of said lips.

11. A seal assembly as in claim 10 said upper seal ring also having a pair of flexible lip portions extending downwardly with the outer surface of each lip being linear for a majority of its length, said elastomeric seal ring including a substantial portion located between said flexible lip portions of said upper seal ring whereby axial force on said metallic rings compresses said elastomeric seal ring which in turn forces said lip portions outwardly.

12. A seal assembly as in claim 11: the outer surface of the lip portions being substantially parallel, the portion of the elastomeric seal ring forming the greater thickness extending on only one side of said metallic seal rings.

13. A seal assembly as in claim 11: said elastomeric ring having a reduced diameter portion at the upper end, adjacent the upper metallic ring, of substantially the same thickness as said upper ring and axially extending sufficient to prevent rollover of the elastomer around the lip portion of said upper seal ring.

* * * * *

UNITED STATES PATENT AND TRADEMARK OFFICE
CERTIFICATE OF CORRECTION

PATENT NO. : 4,521,040
DATED : June 4, 1985
INVENTOR(S) : Richard W. Slyker; John R. Pettit It is certified that error appears in the above—identified patent and that said Letters Patent is hereby corrected as shown below:

On the title page,
Assignee: Cancel "Offshort" insert --Offshore--.

Column 4, line 13 after claim cancel "3" insert --1--.

Signed and Sealed this

Eighth Day of October 1985

[SEAL]

Attest:

Attesting Officer

DONALD J. QUIGG

Commissioner of Patents and
Trademarks—Designate